(12) United States Patent
Boran et al.

(10) Patent No.: US 6,169,479 B1
(45) Date of Patent: Jan. 2, 2001

(54) VEHICULAR DEFORMATION SENSOR SYSTEM

(75) Inventors: Colm Peter Boran, Novi, MI (US); Eric Lewis Raphael, Stratford-upon-Avon (GB); Gary Richard Collins, Brownstown; Paul Zoratti, South Lyon, both of MI (US)

(73) Assignee: Visteon Global Technologies, Inc., Dearborn, MI (US)

( * ) Notice: Under 35 U.S.C. 154(b), the term of this patent shall be extended for 0 days.

(21) Appl. No.: 09/178,042

(22) Filed: Oct. 23, 1998

(51) Int. Cl.[7] ........................ B60Q 1/00
(52) U.S. Cl. ............... 340/436; 340/501; 340/903; 340/904; 342/72; 367/909; 180/169; 73/1.15; 73/1.39; 73/12.01; 73/760
(58) Field of Search .................. 340/436, 901, 340/903, 904; 342/70, 71, 72; 367/909; 180/167, 168, 169, 170; 73/1.15, 1.37, 1.39, 1.38, 11.01, 12.01, 760, 763, 781, 783, 789, 788

(56) References Cited

U.S. PATENT DOCUMENTS

| | | |
|---|---|---|
| 4,346,914 | 8/1982 | Livers et al. . |
| 4,609,845 * | 9/1986 | Soni et al. ........................ 310/357 |
| 5,164,709 | 11/1992 | Lamberty et al. . |
| 5,423,569 | 6/1995 | Reighard et al. . |
| 5,428,534 | 6/1995 | Wetzel et al. . |
| 5,445,412 | 8/1995 | Gillis et al. . |
| 5,629,681 | 5/1997 | DuVall et al. . |
| 5,737,224 * | 4/1998 | Jeenicke et al. .................. 340/436 |
| 5,746,444 * | 5/1998 | Foo et al. ........................ 280/735 |
| 5,748,075 | 5/1998 | Dirmeyer et al. . |
| 5,767,766 | 6/1998 | Kwun . |
| 5,835,007 * | 11/1998 | Kosiak ............................. 340/436 |
| 5,847,643 * | 12/1998 | Keith ............................... 340/436 |
| 5,907,213 * | 5/1999 | Oshima et al. .................. 310/328 |
| 5,916,289 * | 6/1999 | Fayyad et al. .................... 701/45 |

* cited by examiner

Primary Examiner—Nina Tong
(74) Attorney, Agent, or Firm—Larry I. Shelton

(57) ABSTRACT

A sensor system for detecting impacts to a vehicle, allowing for actuation decisions of passive restraint devices. The sensor system includes one or more piezoelectric sensor assemblies (42), each including a coaxial piezoelectric cable (44) contained within a tube housing (54), which is mounted to a structural member of the vehicle. The sensor system may also include accelerometers (36, 38) that are also in communication with the restraints control module (40) and employed in combination with one or more piezoelectric sensor assemblies (42). Further, the sensor system may include diagnostics for monitoring one or more of the sensor assemblies (42) in order to detect a sensor failure, while not interfering with the impact signals from the sensor assemblies (42).

18 Claims, 3 Drawing Sheets

VEHICULAR DEFORMATION SENSOR SYSTEM

FIELD OF THE INVENTION

The present invention relates to sensors employed to detect vehicle impact events and more particularly to sensors mounted about portions of a vehicle in order to detect vehicle impact events and actuate passive restraint systems in the vehicle.

BACKGROUND OF THE INVENTION

Almost all vehicles presently produced include some type of a passive restraint system to protect vehicle occupants, or others, during a vehicle impact event. Such passive restraint systems may include, for example, front and side airbags within the passenger compartment, seat belt pretensioners, and pedestrian airbags near the front of a vehicle. In order for the passive restraints to operate quickly when needed, and only when actually needed, sensor systems must be mounted on the vehicle to determine the severity and type of impact and actuate the proper passive restraint devices.

Some types of sensors used for impact measurements on vehicles approximate or infer the type of impact being experienced. Such sensors may be, for example, accelerometers, pressure sensors and crush-zone switches. While they can work adequately, it is desirable to improve the discrimination ability of vehicle impact sensing systems thus improving the passive restraint deployment decision upon vehicle impact.

Accelerometers, when used alone, may require very complex algorithms in order to properly distinguish various impact events. Pressure sensors have also been suggested, but may be too susceptible to changes to the surrounding vehicle environment. Further, simple switch contacts around the vehicle perimeter may be used but give little information regarding the intruding object's profile and/or velocity, making passive restraints deployment decisions difficult. Consequently, a desire exists to provide for more accurate sensing that will allow for discrimination between different types and severities of vehicle impact events to provide improved passive restraint actuation decisions, within minimal time frames.

SUMMARY OF THE INVENTION

In its embodiments, the present invention contemplates a vehicle sensor assembly for detecting vehicular impacts causing structural members of a vehicle to deform. The sensor assembly includes a coaxial piezoelectric cable for detecting strain applied thereto, and a tube housing having a cavity extending along its length with the piezoelectric cable contained within the cavity. Means are adapted for mounting the tube housing adjacent to one of the structural members of the vehicle, and extending generally along the member, and a controller is in communication with the piezoelectric cable for receiving strain related signals therefrom.

The present invention further contemplates a method of detecting impacts with a vehicle having structural members that deform in an impact and at least one passive restraint, the method comprising the steps of: sensing an impact induced strain in the vehicle structural member with a coaxial piezoelectric cable and producing a corresponding strain signal; sensing the acceleration of the vehicle and producing a corresponding acceleration signal; determining the severity of the impact from the strain signal and the acceleration signal; comparing the severity of impact to a threshold value; and actuating the at least one passive restraint if the threshold is exceeded by the severity of impact.

Accordingly, an object of the present invention is to employ a piezoelectric cable mounted to structural members of a vehicle to discriminate between different impact events and provide a signal used to determine deployment of passive restraints within a vehicle.

An advantage of the present invention is that the piezoelectric cable sensor can be employed in combination with one or more acceleration sensors in order to further improve the passive restraints deployment decision.

A further advantage of the present invention is that the piezoelectric cable provides a variable output that is used to discriminate between various impact situations, thus improving passive restraint deployment decisions.

Another advantage of the present invention is that the piezoelectric sensor cable is mounted within a protective housing that will prevent inadvertent signals from actuating passive restraints due to non-impact events such as a vehicle door being slammed, etc.

A further advantage of the present invention is that a diagnostic check is employed without interfering with the sensor impact signal to assure that the piezoelectric sensor system is operating properly, while also assuring proper control of the passive restraints, as the vehicle ages.

DETAILED DESCRIPTION OF THE PREFERRED EMBODIMENTS

Figures 1, 2, 3:
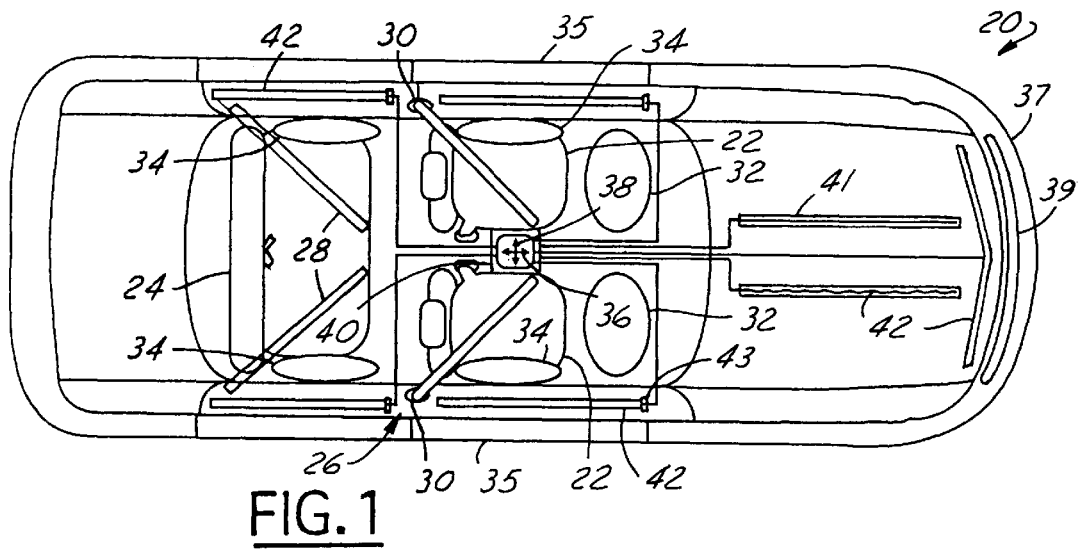
FIG. 1 is a schematic plan view of a vehicle, including sensors, in accordance with the present invention.
FIG. 2 is a schematic side view of a vehicle door, with a sensor assembly mounted thereon.
FIG. 3 is a schematic, cutaway, perspective view of a sensor assembly and cable illustrating the different layers of the sensor assembly.

A vehicle 20 including the present invention is illustrated in FIGS. 1–4. The vehicle has front 22 and rear 24 seats in a passenger compartment 26. Mounted in proximity to each seat is a seat belt 28, each of which may be equipped with pretensioners 30. Mounted in front of the two front seats 22 are front airbags 32. The illustrated vehicle 20 includes four doors 35, with side airbags 34 mounted alongside them, adjacent the front 22 and rear 24 seats. A front bumper 37 is mounted to the vehicle 20, with a pedestrian airbag 39 mounted in proximity to the bumper 37.

The vehicle 20 may also be equipped with accelerometers, a first frontal accelerometer 36 oriented to sense longitudinal acceleration of the vehicle and a second side accelerometer 38 oriented to sense side-to-side (i.e., lateral) acceleration. Alternatively, the two accelerometers can be replaced with a single dual-axis acceleration sensor if so desired. These accelerometers 36, 38 are electronically connected to and in communication with a restraints control module 40.

Piezoelectric sensor assemblies 42 are also electrically connected to the restraints control module 40 via signal processing modules 43. Each of the sensor assemblies 42 includes coaxial piezoelectric cable 44. The cable 44 includes a generally cylindrical center conductor 46 surrounded by a piezo-polymer 48, such as polyvinylidene fluoride, which is in turn surrounded by a copper shield 50 and a polyethylene jacket 52. Hollow cylindrical tube housings 54 include cavities that surround each of the cables 44 and act as shields to protect against damage to the sensors and limit erroneous deformation sensing by the cable 44. While illustrated as a full cylinder, the tube can also take other forms; it can be a U-shaped member or a material laminated to the jacket 52, which will also protect against damage. Thus, when referring to the tube housing 54 herein, the other possible shapes are also meant to be included.

The housings 54 are mounted to various structural elements of the vehicle 20 generally around portions of its perimeter, near its outer surface, although they may also be mounted to structural members designed to deform and absorb crash energy, even though not an outer surface. Generally, the sensor assemblies 42 will be mounted in areas around the vehicle body in which impact sensing is desired. Sensor assemblies 42 can be mounted in all four doors 35, between inner 31 and outer 33 door panels, as well as behind the front bumper 37 of the vehicle 20. Other locations may also be desirable. For example, the piezoelectric sensor assembly 42 may also be mounted to the chassis frame rails 41 of a vehicle. Further, given the flexibility inherent in this type of cable, the sensor assembly 42 need not be mounted along a straight line path. As can be seen along the passenger side frame rail 41 in FIG. 1, the cable is mounted in a generally sinusoidal pattern along the rail. Other shapes may also be employed, depending upon the particular component and the output response desired.

For example, as can be seen in FIG. 2, the sensor assembly 42 is illustrated mounted within a vehicle door 35. A main structural reinforcement beam 56 is affixed to the door outer panel 33, with the sensor assembly 42 mounted securely thereto via attachment points 58. The attachment points 58, can be fasteners, welding, etc., so long as the sensor assembly 42 is securely and rigidly mounted to the structure.

Figure 4:
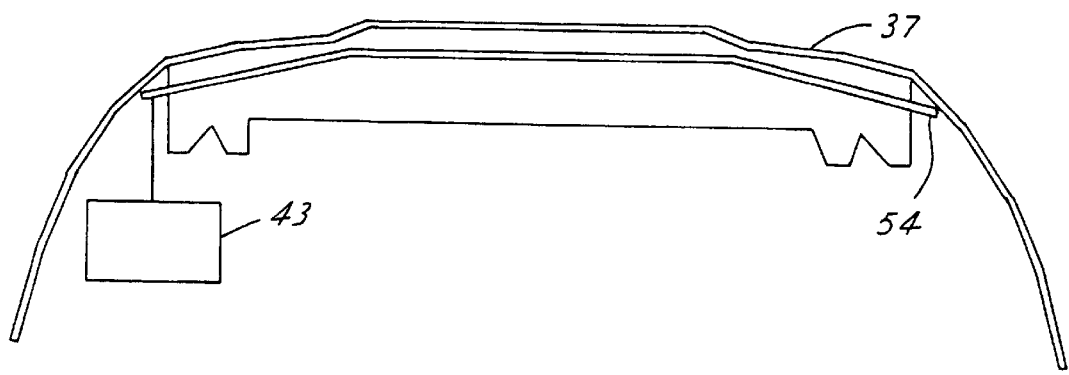
FIG. 4 is a schematic plan view of a vehicle front end and sensor.

FIG. 4 illustrates an example of one of the sensor assemblies 42 mounted just behind the front bumper 37. This sensor assembly 42 will detect impacts to the front bumper 37 and allow for two possible separate and different deployments. The first may be the pedestrian airbag 39 if the impact occurs without a large deceleration of the vehicle. The second may be the front airbags 32 if impact is detected by the piezoelectric sensor 44 mounted behind the front bumper and the frontal accelerometer 36 detects a deceleration of the vehicle above a predetermined threshold. This, of course, assumes that the frontal accelerometer 36 is also employed for that particular vehicle. Of course, one may desire to employ the sensor assemblies 42 without the accompanying accelerometers depending upon the particular use of the sensor assemblies 42.

Figure 7:
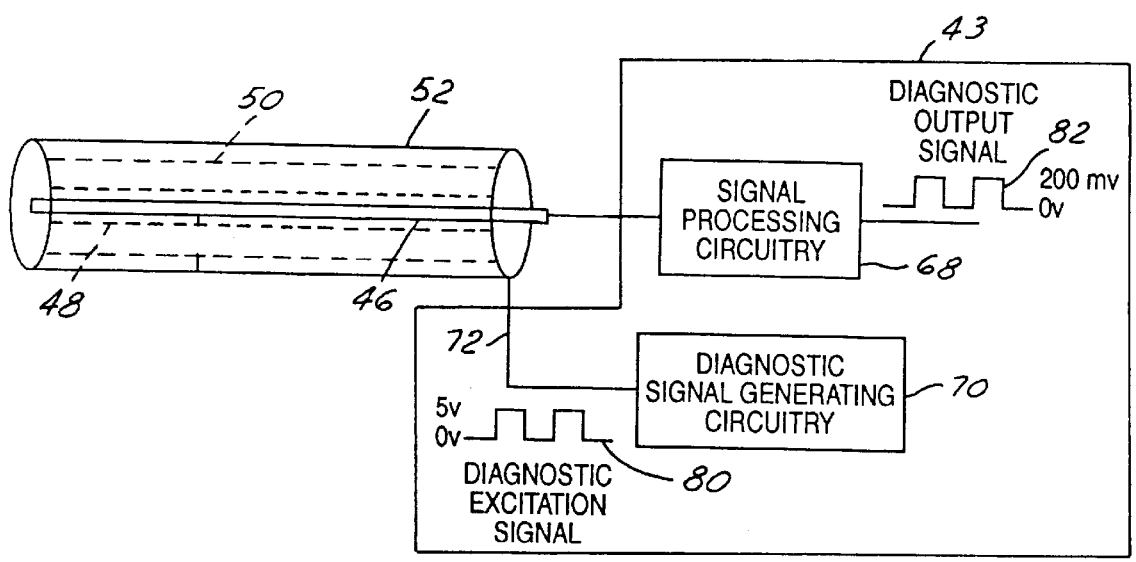
FIG. 7 is a schematic illustration of diagnostics associated with the sensor.

FIG. 7 illustrates a schematic of diagnostics for each of the piezoelectric sensor assemblies 42 on the vehicle. Given that there may be potential for damage to any one of the piezoelectric sensor assemblies 42 over the life of a vehicle, the signal processing modules 43 and/or the restraints control module 40 not only processes signals to determine impact events, but also may include the capability for diagnostics. The modules 40, 43 include signal processing circuitry 68 and diagnostic signal generation circuitry 70. Also, each of the sensor assemblies 42 includes an electrical connection 72 connected between the module 43 and the copper shield 50.

The operation of the system will now be discussed. The piezoelectric sensor in the crush zone of the vehicle provides a variable output proportional to the strain induced in the sensor from an intruding object during an impact. It will be noted that this sensor assembly is particularly easy to mount around the perimeter of the vehicle 20 or in other locations such that it will deform early in an impact event.

Figure 5A:
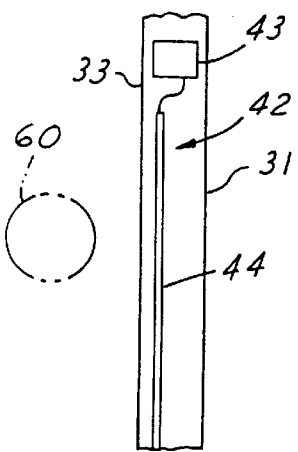
FIGS. 5A–5C are graphical illustrations of the approach of the side of a vehicle to a pole and impact therewith, in accordance with the present invention.
Figure 5B:
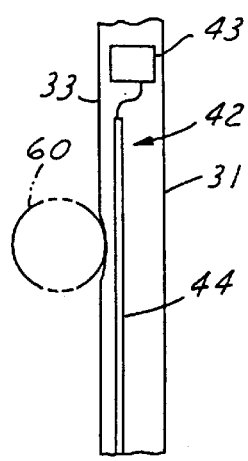
Figure 5C:
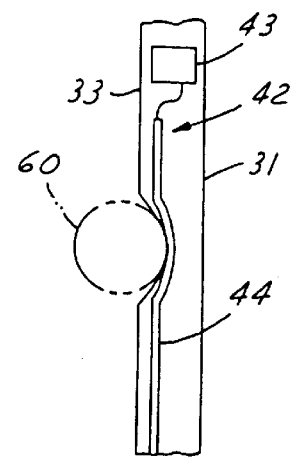
Figure 6A:
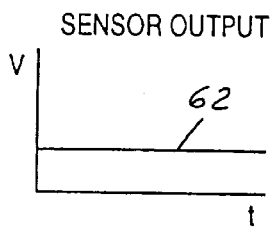
FIGS. 6A–6C are graphical illustrations of the sensor output, corresponding to FIGS. 5A–5C, respectively.
Figure 6B:
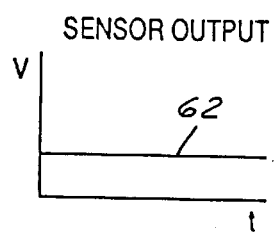
Figure 6C:
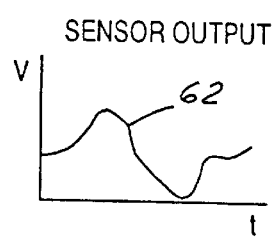

FIGS. 5A–5C illustrate an example showing a sequence of views illustrating a side impact into the vehicle door 35 by a pole 60 and the deformation of the piezoelectric cable 44, while FIGS. 6A–6C illustrate a corresponding voltage signal 62 transmitted by the signal processing modules 43 during this pole impact event. In FIG. 5A, the pole 60 is seen as still spaced from the outer door panel 33 of the door 35, hence the voltage signal 62, illustrated in FIG. 6A, is constant, indicating no strain sensed by the cable. In FIG. 5B, the pole 60 has just begun to impact and deform the outer door panel 33 a very small amount, but has not penetrated sufficiently to impart a strain to the piezoelectric cable 44, and so, as is seen in FIG. 6B, the voltage signal 62 is again constant. FIG. 5C illustrates the pole 60 sufficiently penetrating the outer door panel 33 that the piezoelectric cable 44 is now deformed from the force of the impact. FIG. 6C illustrates the voltage signal 62 which has now changed to reflect the amount of strain induced in the sensor.

This signal 62 is sent via the signal processing module 43 to the restraints control module 40, which then interprets the signal 62 to discriminate between different types and severity of impacts. Given that different types of objects impacted, such as poles, barriers, pedestrians and other vehicles, will produce different sensor output signals for a given speed and acceleration of the vehicle during the impact event, the signal 62 will vary accordingly. The ability to distinguish, for example, pole-impact events from low-speed barrier impacts, will provide a more accurate decision from the restraints control module 40 for when to deploy a passive restraint device.

The restraints control module 40 includes hardware and/or software for processing incoming signals, determining if a passive restraint threshold has been met and sending a signal to the passive restraints, such as the front airbags 32, the side airbags 34, and/or the seat belt pretensioners 30.

In order to further improve impact determination and passive restraint firing decisions, one may wish to employ output from the piezoelectric sensor assemblies 42 along with the output from the acceleration sensors 36, 38. The accelerometers 36, 38 are illustrated in FIG. 1 and also provide output signals processed by the restraints control module 40. While the acceleration sensors are illustrated in the preferred embodiment, they are not necessary for operation of the piezoelectric sensors.

For example, the particular piezoelectric sensor 42 near the impact location may be used as the primary impact detection sensor, with the centrally mounted accelerometers employed as safing sensors. In this way, the characteristics of the strain detected by the piezoelectric sensors may be tempered by the amount of acceleration experienced by the vehicle as is detected by one or both of the accelerometers 36, 38. Another example of impact detection in which the different sensors are employed may include employing the accelerometers 36, 38 as the primary sensors for impact events, and modifying the thresholds for the deployment decision based upon the strain detected by a particular one of the piezoelectric sensor assemblies 42.

The operation of the piezoelectric sensor assembly 42 also includes a diagnostics protection system to ensure the integrity of the sensors. The diagnostic signal generation circuitry 70 generates a signal 80 on the copper shield 50 with a predetermined voltage at low frequency, for example around five volts at about five to twenty hertz. This signal 80 is inherently capacitively coupled to the center conductor 46 through the piezo-polymer dielectric 48. The resulting output signal 82 emerging from the signal processing circuitry 68 results in a low voltage, low frequency output, for example 200 millivolts at five to twenty hertz, which can be monitored within either the signal processing module 43 as shown, or the restraints control module 40 if so desired. An algorithm within the module 43 will monitor this signal apart from the main signal being received for impact detection purposes. Any absence of this output signal 82 indicates a connectivity failure somewhere in the sensing system. An error signal can then be sent to a light on the vehicle instrument panel to indicate such to the vehicle operator.

This diagnostic monitoring, then, can be done continuously, even as impact detection is being monitored since the low frequency, low amplitude of the diagnostic output signal 82 will not interfere with the impact detection signal.

While certain embodiments of the present invention have been described in detail, those familiar with the art to which this invention relates will recognize various alternative designs and embodiments for practicing the invention as defined by the following claims.

We claim:

1. A vehicle sensor assembly for detecting structural deformation of members of a vehicle, the sensor assembly comprising:
    a coaxial piezoelectric cable for detecting strain applied thereto;
    a tube housing having a cavity extending along its length with the piezoelectric cable contained within the cavity;
    means adapted for mounting the tube housing adjacent to one of the structural members of the vehicle and extending generally along the member; and
    a controller in communication with the piezoelectric cable for receiving strain related signals therefrom, wherein said strain related signals correspond to an amount of said vehicle structural deformation, and wherein said controller compares said strain related signals to a threshold to sense a predetermined deformation.

2. The vehicle sensor assembly of claim 1 wherein the piezoelectric cable is adapted to be mounted in a side door of the vehicle, extending generally along the length of the door.

3. The vehicle sensor assembly of claim 1 wherein the piezoelectric cable is adapted to be mounted behind a front bumper of the vehicle, extending over a portion of the length of the front bumper.

4. The vehicle sensor assembly of claim 3 wherein the controller is adapted to be in communication with a pedestrian airbag mounted in proximity to a front bumper of the vehicle.

5. The vehicle sensor assembly of claim 1 wherein the controller is adapted to communicate with at least one of a seat belt pretensioner, a front airbag and a side airbag.

6. The vehicle sensor assembly of claim 1 wherein the piezoelectric cable is adapted to be mounted on a frame rail of the vehicle.

7. The vehicle sensor assembly of claim 1 further including an accelerometer sensor, oriented to detect acceleration in a lateral direction of the vehicle, and in communication with the controller.

8. The vehicle sensor assembly of claim 7 wherein the piezoelectric cable is adapted to be mounted in a side door of the vehicle, extending generally along the length of the door.

9. The vehicle sensor assembly of claim 1 further including an accelerometer sensor, oriented to detect acceleration in a longitudinal direction of the vehicle, and in communication with the controller.

10. The vehicle sensor assembly of claim 9 further comprising:
    a second coaxial piezoelectric cable, for detecting strain applied to thereto, and in communication with the controller;
    a second tube housing having a cavity extending along its length with the second piezoelectric cable contained within the cavity; and
    means adapted for mounting the second tube housing adjacent to a different one of the structural members of the vehicle.

11. The vehicle sensor assembly of claim 1 wherein the piezoelectric cable includes a generally cylindrical center conductor surrounded by a piezo-polymer, with the piezo-polymer surrounded by a copper shield and a jacket.

12. The vehicle sensor assembly of claim 1 further comprising:
    a second coaxial piezoelectric cable, for detecting strain applied to thereto, and in communication with the controller;
    a second tube housing having a cavity extending along its length with the second piezoelectric cable contained within the cavity; and
    means adapted for mounting the second tube housing adjacent to a different one of the structural members of the vehicle.

13. A passive restraint system in a vehicle having structural members, the passive restraint system comprising;
    a coaxial piezoelectric cable for detecting strain applied thereto;
    a tube housing having a cavity extending along its length with the piezoelectric cable contained within the cavity;
    means for mounting the tube housing adjacent to one of the structural members of the vehicle, and extending generally along the member;
    a controller in communication with the piezoelectric cable for receiving strain related signals; and
    a passive restraint mounted within the vehicle and actuable by the controller,
wherein said strain related signals correspond to an amount of said vehicle structural deformation and wherein said controller activates said passive restraint in response to a comparison of said strain related signals to a threshold.

14. The passive restraint system of claim 13 wherein the passive restraint is front airbag.

15. The passive restraint system of claim 14 further including an accelerometer sensor, oriented to detect acceleration in a longitudinal direction of the vehicle, and in communication with the controller.

16. The passive restraint system of claim 13 wherein the passive restraint is a side airbag.

17. The passive restraint system of claim 16 further including an accelerometer sensor, oriented to detect acceleration in a lateral direction of the vehicle, and in communication with the controller.

18. A method of detecting impacts with a vehicle having structural members that deform in an impact and at least one passive restraint, the method comprising the steps of:

sensing an impact induced strain in the vehicle structural member with a coaxial piezoelectric cable and producing a corresponding strain signal;

sensing the acceleration of the vehicle and producing a corresponding acceleration signal;

determining the severity of the impact from the strain signal and the acceleration signal;

comparing the severity of impact to a threshold value; and actuating the at least one passive restraint if the threshold is exceeded by the severity of impact.

* * * * *